Figure 1:
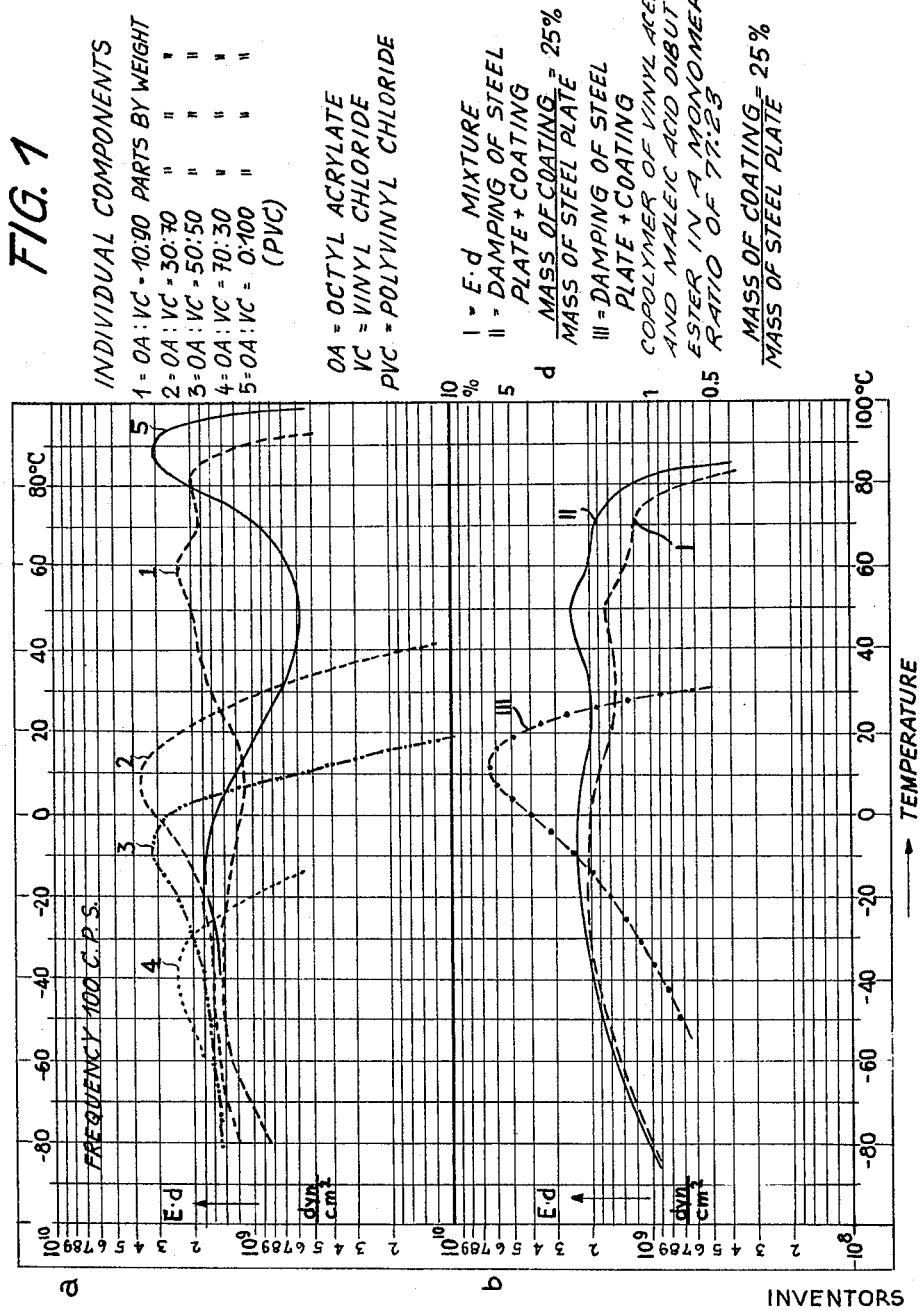

MIXING COMPONENTS

MIXTURE OF BROAD TEMPERATURE BAND

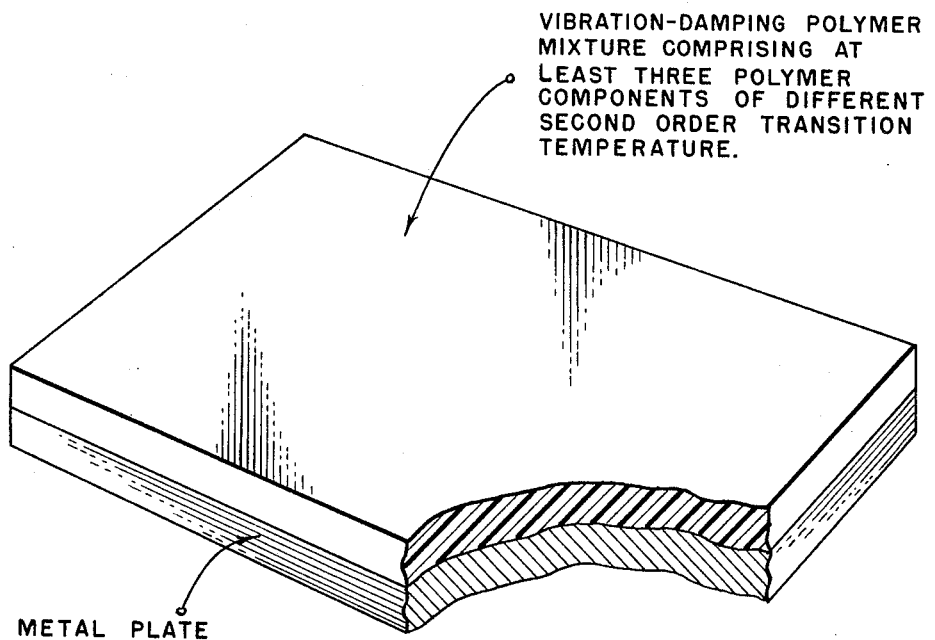

United States Patent Office 3,271,188
Patented Sept. 6, 1966

3,271,188
VIBRATION DAMPING POLYMER MIXTURE ON METAL PLATE
Walter Albert, Lothar Bohn, and Joachim Ebigt, Frankfurt am Main, Hermann Oberst, Hofheim, Taunus, and Horst Pfister, Frankfurt am Main, Germany, assignors to Farbwerke Hoechst Aktiengesellschaft vormals Meister Lucius & Brüning, Frankfurt am Main, Germany, a corporation of Germany
Filed Sept. 7, 1960, Ser. No. 54,386
Claims priority, application Germany, Sept. 11, 1959, F 29,363
2 Claims. (Cl. 117—132)

The present invention relates to vibration damping materials which are highly effective within a wide temperature range and which are made of mixtures of highly polymeric substances without external plasticizer.

By the so-called vibration damping materials there are to be understood coatings of materials that are applied to sheet metal constructions, especially steel plate constructions in order to damp their vibrations (resonance). In contradistinction to known agents that absorb sounds transmitted by air, the vibration damping materials serve to reduce the sound vibrations of solids so that a radiation of sounds transmitted by air is avoided.

Vibration damping materials become more and more important in industry and increasing demands are made on the quality of the damping coatings. Great efforts are being made to develop materials that are capable of damping vibration effectively at low and high temperatures as well as at normal temperature, that is to say the temperature band (range) of vibration damping at the customary frequencies of 100 to 200 cycles per second (Hertz) should be so broad that all demands of modern technics are met. A coating material that, when applied to sheet metal constructions, especially to steel plate constructions, uniformly damps the vibration over a wide temperature range, which is measured by the mechanical loss factor $d$ of the combination of sheet metal with coating, is referred to in the following as vibration damping material of broad temperature band. Such a material has the advantage of being effective at any given temperature within a large frequency range.

The conditions that a vibration damping material must fulfil in order to attain, for example on steel plate constructions, as high a damping action as possible are already known (cf. H. Oberst, K. Frankenfeld, Acustica 2 (1932), AB 181; H. Oberst, G. W. Becker, K. Frankenfeld, Acustica 4 (1954), 433). The product of the dynamic elasticity modulus and the mechanical loss factor (measurement for the hysteresis losses of the vibration damping material) must be as great as possible.

In general, vibration damping materials make use of the maximum of the internal mechanical losses (hysteresis) occurring in the transition of the hard to the soft state (second order transition range) when high polymers are subjected to vibratory stress. The temperature range depends on the second order transition temperature of the substance, which is mostly determined volumetrically. However, by the second order transition temperature there is to be understood in the following the temperature at which in the short time measurement with the above mentioned reference frequency of 100 or 200 c.p.s. the maximum of mechanical losses occurs. The said second order transition temperature defined in a short time experiment is, in general, about 50° C. above the volumetrically determined temperature.

All known vibration damping materials consist of homopolymers or copolymers having a relatively homogeneous structure which show a sharp transition between the hard and the soft state and, therefore, possess the disadvantage that the temperature range of a good damping is relatively limited.

It has now been found that mixtures, which do not contain external plasticizers, of homo- and/or copolymers which differ in their second order transition temperature and consequently in the temperature range of their damping center by at least 10° C. to at most 200° C. and which mixtures are composed of suitable proportions of the homo- and/or copolymers, have good vibration damping properties within a considerably wider temperature range than known vibration damping materials when applied to sheet metal and especially to steel plates. The temperature band of vibration damping is determined by the mixing component having the highest and the mixing component having the lowest second order transition temperature.

It has furthermore been found that chemically heterogeneous copolymers which are composed, on the one hand, of (a) vinyl ethers and/or acrylic acid esters and/or methacrylic acid esters and/or maleic acid esters of alcohols containing 4 to 12 carbon atoms and/or vinyl esters of fatty acids containing 4 to 12 carbon atoms and/or butadiene and, on the other, of (b) vinyl esters of fatty acids containing 2 or 3 carbon atoms and/or acrylic acid esters and/or methacrylic acid esters of alcohols containing 1 to 3 carbon atoms and/or acrylonitrile and/or vinyl chloride and/or vinylidene chloride and/or styrene, and also copolymers the components of which either belong to group (a) only or to group (b) only are especially suitable as vibration damping material of broad temperature band, when the structures of the macromolecules are so different that the second order transition temperatures of said macromolecules are sufficiently remote from one another.

A better understanding of the invention will be had by referring to the accompanying drawings.

Figure 2:
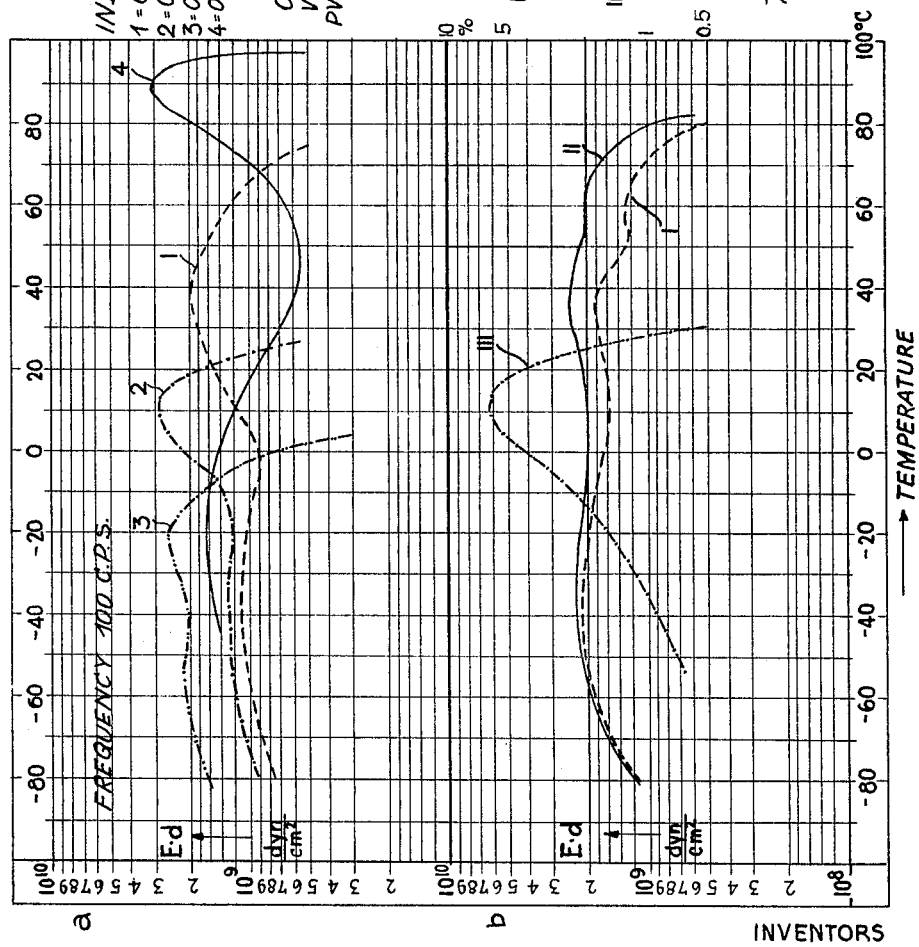
Figure 3:
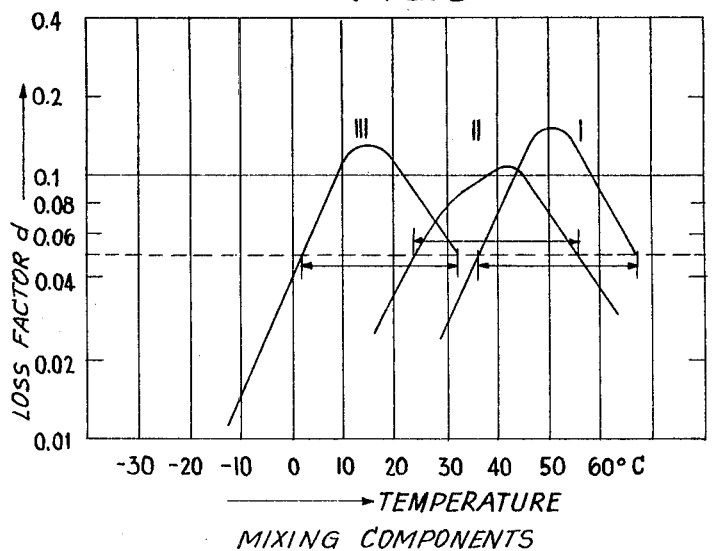

In FIGURE 1, having sections $a$ and $b$, section $a$ is a plot, on the ordinate, of the product of the vibration damping and the modulus of elasticity versus temperature, on the abscissa, for five different polymers; and section $b$ is a similar plot showing the vibration damping properties of a mixture of the same five polymers according to the present invention (curve I), and comparing the vibration damping properties of a steel plate coated with such a mixture (curve II) with those of a steel plate coated with a homogeneous copolymer used in the prior art as a vibration damping material (curve III);

In FIGURE 2, having sections $a$ and $b$, section $a$ is a plot, on the ordinate, of the product of the vibration damping and the modulus of elasticity versus temperature, on the abscissa, for four different polymers; and section $b$ is a similar plot showing the vibration damping properties of a mixture of the same four polymers according to the present invention (curve I), and comparing the vibration damping properties of a steel plate coated with such a mixture (curve II) with those of a steel plate coated with a homogeneous copolymer used in the prior art as a vibration damping material (curve III);

FIGURE 3 is a plot, on the ordinate, of the loss factor versus temperature, on the abscissa, for three steel plates separately coated with three different polymers (I, II, III);

FIGURE 3$a$ is a similar plot showing the loss factor as a function of temperature for a steel plate coated with a mixture of the same polymers (I+II+III); and FIGURE 4 is a perspective view, partly in section, of a metal plate having thereon a vibration-damping polymer mixture according to the invention, which mixture comprises at least three polymer components of different second order transition temperature.

The copolymers may also contain further additives, for example natural rubbers, copolymers of butadiene with styrene or butadiene with acrylonitrile, copolymers having a high content of acrylonitrile, or epoxide resins, polyester resins, phenol/formaldehyde resins or melamine/formaldehyde resins.

The required heterogeneity of the chemical constitution can be obtained by copolymerizing suitable monomers that are characterized, for example, by different polymerization speeds. Thus polymer portions are produced that are enriched with monomers of group (a) as well as with monomers of group (b). By the different second order transition temperatures of the heterogeneously composed polymer portions a plastic material is obtained which possesses vibration damping properties in two or more temperature ranges.

The limits of the effective temperature range of all vibration damping materials are defined by the polymers or polymer portions of the heterogeneous copolymer that have the lowest or the highest second order transition temperature. The polymers of different second order transition temperatures must be mixed in a manner such that not only the two limiting components but also the polymer components between the two limiting components are incorporated into the vibration damping material in a sufficient amount so as to guarantee a fairly smooth transition.

By selecting a pair of monomers, such as, for example, 2-ethylhexyl-acrylate and vinyl chloride (this pair has proved to be especially suitable) and by an appropriate mixture of copolymers having a high and a low acrylate content, a vibration damping material can be easily obtained which is effective, for example, in a range from $-80°$ C. to $+80°$ C. If the temperature range for the optimum vibration damping can be smaller, for example from $10°$ C. to $40°$ C., which range is sometimes sufficient, a vibration damping material of narrow temperature band can be prepared by an appropriate choice of the components, which material has a higher medium damping property than materials of broad temperature ranges.

The copolymers can be produced by known processes. A vibration damping material of broad temperature band thus obtained furthermore complies with the conditions required in practice that the components are compatible with one another and stable, that is to say storable. The vibration damping materials according to the invention can be filled with fillers, for example mica, expanded mica, graphite, carbon black, chemically pure silicic acid in submicroscopically fine distribution, for example as commercially available under the name of Aerosil (registered trademark) and other active fillers, wood powder or cork powder.

The vibration damping materials according to the invention can be sprayed as dispersion with or without filler on the metal sheets the vibrations of which are to be dampened, or they can be applied as a foil to a metal sheet or interposed between several metal sheets.

The following examples serve to illustrate the invention but they are not intended to limit it thereto. The percentages and parts are by weight unless otherwise stated.

*Example 1*

A suspension copolymer obtained by copolymerizing a mixture consisting of 90 parts of vinyl chloride and 10 parts of 2-ethylhexyl acrylate, possesses, on account of the greater reaction velocity of 2-ethylhexyl acrylate, the desired chemically heterogeneous constitution, since at the beginning of the polymerization a copolymer of 60 parts of vinyl chloride and 40 parts of 2-ethylhexyl acrylate is produced while at the end pure polyvinyl chloride is formed, so that the product practically represents a mixture of polyvinyl chloride with a series of copolymers containing 1 to 40% of 2-ethylhexyl acrylate. Since the vibration damping of, for example, steel plates, at a definite temperature and a definite service frequency depends on the amount of a substance which at the given temperature is just in the transition range of the hard to the soft state or vice versa (range of second order transition temperature) said copolymer is effective, on the one hand, in the range of the second order transition temperature of the copolymer portion richest in acrylate and consisting of 60 parts of vinyl chloride and 40 parts of 2-ethylhexylacrylate and, on the other, of polyvinyl chloride, but the degree of damping is not uniform over the entire temperature range. This fact is confirmed by the measurement of the vibration damping and the elasticity modulus (cf. accompanying FIGURE 1, section *a*, curve I). In practice said products give good results in many cases already when used alone. When, however, the optimum limits of the products made on the basis of said monomers shall be covered and simultaneously a uniform damping shall be produced over the whole temperature range, it is necessary to add to the said copolymer one or several copolymers having a higher acrylate content. By the addition of said soft copolymers the damping range of the aforesaid copolymer is restricted at elevated temperatures so that it is advisable further to add pure polyvinyl chloride in order to obtain a mixture having an optimum damping range. A mixture of this kind having the aforesaid industrially interesting damping properties is analyzed below in tubular form. The mixture comprises five individual polymers, including four copolymers whose monomeric composition is given in the table, and a homopolymer. The damping properties of the five individual polymers are shown respectively by the five damping curves of FIGURE 1, section *a*. The percent by weight of the individual polymers in the damping composition is also given.

TABLE I

| Polymer component | Ratio of vinyl chloride to 2-ethylhexyl acrylate in polymer component | No. of curve in Fig. 1, section *a*, showing damping properties of polymer component | Percent of polymer component in damping composition |
|---|---|---|---|
| 1 | 90:10 | 1 | 79 |
| 2 | 70:30 | 2 | 5 |
| 3 | 50:50 | 3 | 3 |
| 4 | 30:70 | 4 | 3 |
| 5 | 100:0 | 5 | 10 |
| | | | 100 |

The said mixture is mixed with stabilizers, made into a foil by means of an extruder or a calender and applied in a suitable form to the materials to be damped. In FIGURE 1*a* the product of the vibration damping and the elasticity modulus shows the maxima of the damping of the individual components. The temperature band of the mixture from about $-80°$ C. to $+80°$ C. is illustrated in FIGURE 1, section *b*, curve I.

When a 1.5 mm. thick calender foil made of the aforesaid mixture is applied to a steel plate (thickness 1 mm.) (mass ratio of coating to steel plate=0.25) the combination shows the damping curve II of FIGURE 1, section *b*.

With the same amount of coating the average damping height of a broad absorber must be lower than the average height of an absorber of smaller temperature range (cf. FIGURE 1, section *b*, curves II and III). With the present large band width the damping height is referred to the loss factor $d=0.01$. Card board or wood possess a damping in the order of magnitude of 1%.

When the damping coatings are to be applied in the form of dispersions to the material the vibration of which is to be damped such a product is prepared in emulsion.

*Example 2*

An emulsion copolymer produced from a monomer mixture of 80 parts of vinyl chloride and 20 parts of 2-ethylhexyl acrylate already has a good damping property within a wide temperature range (cf. FIGURE 2, section *a*, curve I). For reaching the optimum limits of the broad temperature band it is of advantage, however, to add to the copolymer other vinyl chloride-acrylate copolymers having a higher acrylate content and also polyvinyl chloride.

When, for example, the following mixture is applied in the form of a dispersion or as a foil having a thickness of about 1.5 mm. to 1 mm. thick steel plate, the vibration is damped within the range of —80° C. to +80° C. (cf. FIGURE 2, section b, curves I and II).

TABLE II

| Polymer component | Ratio of vinyl chloride to 2-ethylhexyl acrylate in polymer component | No. of curve in Fig. 2, section a, showing damping properties of polymer component | Percent of polymer component in damping composition |
|---|---|---|---|
| 1 | 80:20 | 1 | 70 |
| 2 | 70:30 | 2 | 5 |
| 3 | 50:50 | 3 | 5 |
| 4 | 100:0 | 4 | 20 |
| | | | 100 |

*Example 3*

A vibration damping material having a narrow temperature band but very high damping values can be composed, for example, of the following substances I, II and III.

(I) is a homopolymeric polyvinyl acetate dispersion;
(II) is a 55% copolymer dispersion of vinyl acetate and maleic acid dibutyl ester, for example in a monomer ratio of 77:23;
(III) is a 50% dispersion of a copolymer of vinyl acetate and acrylic acid butyl ester in a monomer ratio of 55:45.

Figure 3A:
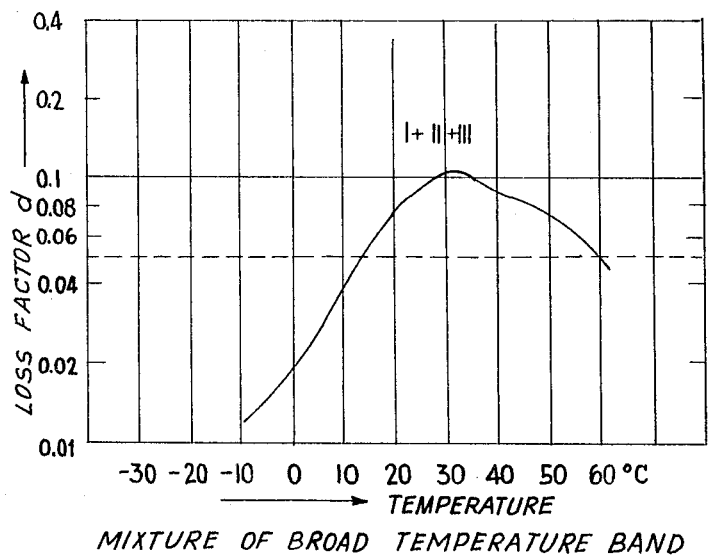

FIGURE 3 represents the loss factor d of three steel plates respectively having damping coatings of the individual mixing components (curves I, II and III). FIGURE 3a shows the loss factor for a steel plate coated with a mixture of the components (curves I+II+III). In both figures, the loss factor is plotted with a ratio of the mass of coating to the mass of steel plate of 20% as a function of the temperature for 200 c.p.s. All coatings are filled with Vermiculite (expanded mica).

The very high damping action is partially obtained by the narrow temperature band and partially by the filling with a light filler.

We claim:
1. A metal plate having on a surface thereof a layer of polymer mixture damping the vibration of said metal plate uniformly over a wide temperature range, the ratio of the mass of said layer of polymer mixture to the mass of said metal plate being from 0.20 to 0.25, said polymer mixture comprising at least three compatible externally unplasticized polymers having second order transition temperatures which differ from one another by from 10° C. to 200° C., the temperature range of vibration damping of said mixture being determined by the two polymer components thereof having the highest and lowest second order transition temperatures, and the uniformity of the damping throughout said temperature range being promoted by the presence of the at least one further polymer component having a second order transition temperature intermediate to said highest and lowest second order transition temperatures.

2. A metal plate as in claim 1 wherein said polymer mixture consists essentially of (1) polyvinyl acetate, (2) a copolymer of vinyl acetate and maleic acid dibutyl ester, and (3) a copolymer of vinyl acetate and acrylic acid butyl ester.

References Cited by the Examiner

UNITED STATES PATENTS

| | | | |
|---|---|---|---|
| 2,624,724 | 1/1953 | Park | 260—86.3 |
| 2,677,672 | 5/1954 | Luce. | |
| 2,720,496 | 10/1955 | Bushnell. | |
| 2,850,471 | 9/1958 | Klein. | |
| 2,868,763 | 1/1959 | Montgomery. | |
| 2,984,583 | 5/1961 | Nagelschmidt. | |
| 3,079,277 | 2/1963 | Painter | 117—121 |

OTHER REFERENCES

Schmidt and Marlies, Principles of High-Polymer Theory and Practice, McGraw-Hill Book Co., 1948 p. 188. TO 156 P 6 S 35—C.6

MURRAY KATZ, *Primary Examiner.*

DONALD ARONLD, LEON J. BERCOVITZ, RICHARD D. NEVIUS, *Examiners.*

H. L. SATZ, JOSEPH B. SPENCER, *Assistant Examiners.*